Figure 23:
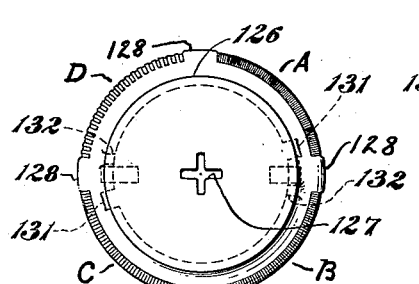

Nov. 7, 1939.  E. J. TE PAS  2,178,976
SHAVING DEVICE
Filed Sept. 19, 1936   3 Sheets-Sheet 1
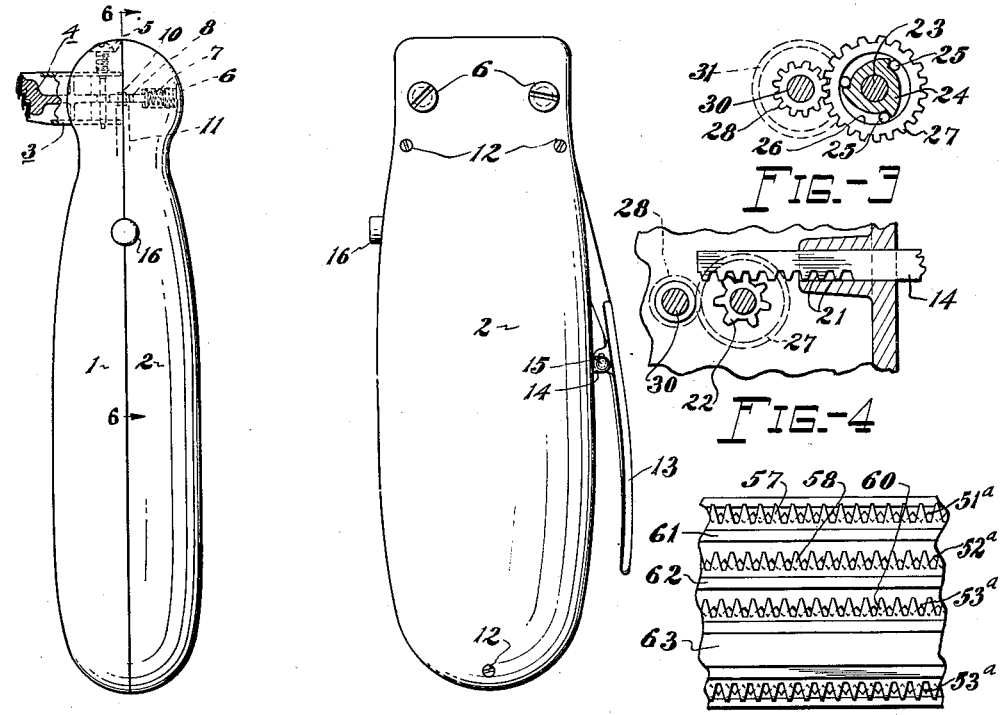
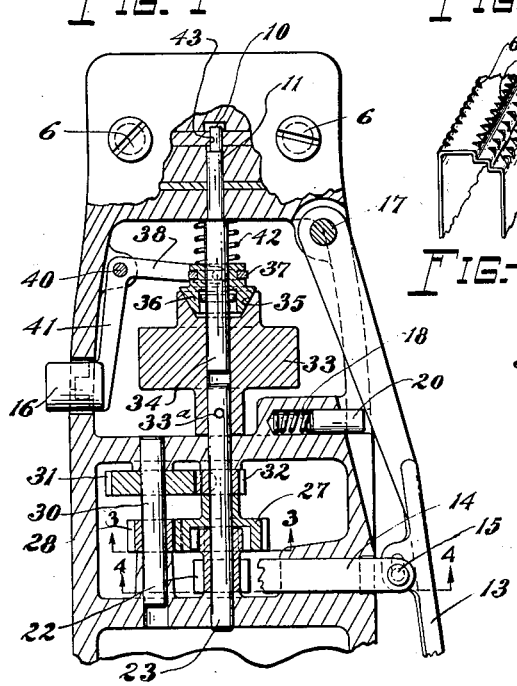
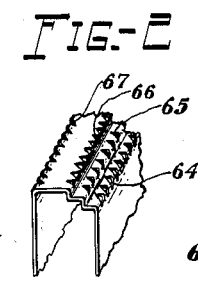
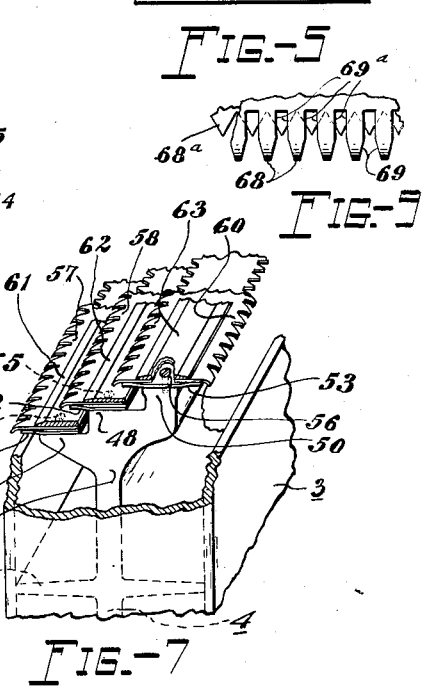
INVENTOR.
Edmund J. Te Pas Nov. 7, 1939.  E. J. TE PAS  2,178,976
SHAVING DEVICE
Filed Sept. 19, 1936   3 Sheets-Sheet 2
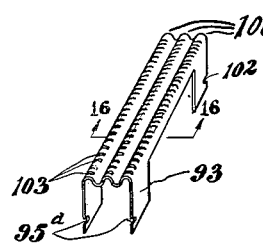
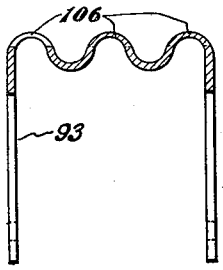
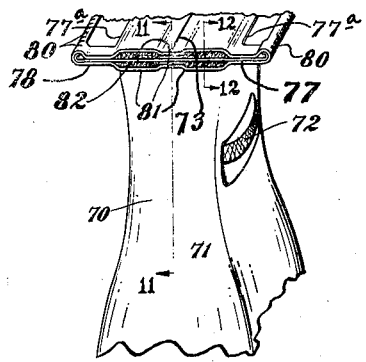
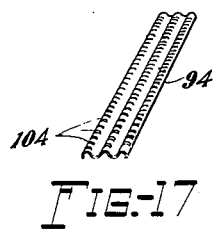
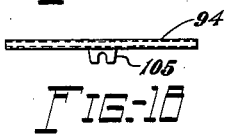
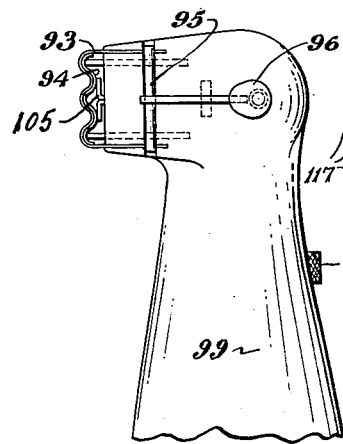
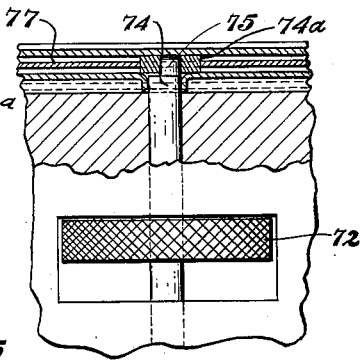
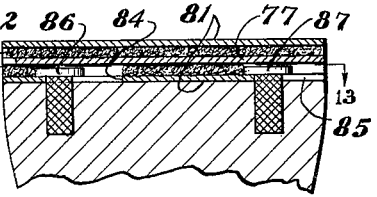
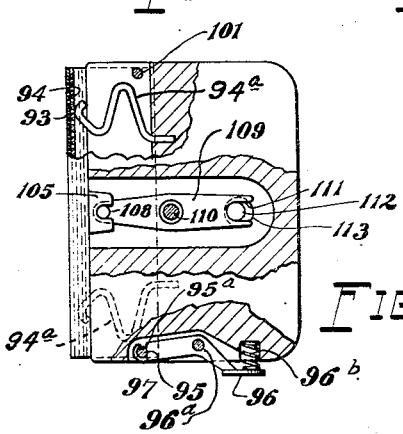
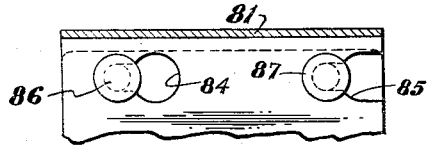
INVENTOR.
Edmund J. Te Pas INVENTOR
Edmund J. Te Pas Patented Nov. 7, 1939

2,178,976

UNITED STATES PATENT OFFICE 2,178,976

SHAVING DEVICE

Edmund J. Te Pas, Euclid, Ohio; Coletta A. Te Pas, administratrix of Edmund J. Te Pas, deceased Application September 19, 1936, Serial No. 101,615

7 Claims. (Cl. 30—43)

This invention relates to hair-cutting devices and in particular devices of the type which are commonly referred to as "dry shavers".

The invention has for its objects the provision of a shaver of the type described, in which the cutter of the shaver is driven by a hand-operated motor which may be selectively connected and disconnected with respect to the cutter at the will of the operator; the provision of a shaver having a manually operated motor with inertia means for storing up power delivered to the motor; the provision of a dry shaver employing a guard member having a plurality of rows of slots which are arranged on different levels, one above the other; the provision of a dry shaver having a guard member with a plurality of rows of slots having open ends presented in the same direction with the individual slots of each row staggered with respect to the individual slots of the other rows; the provision of a dry shaver having a slotted guard member in which the individual slots of the guard member each have tapered and straight portions and in which the hairs are fed from the tapered and wider portions of the slots to the narrower and straight portions of the slots where they are sheared off by a cooperating cutter; the provision of a hair-cutting device of the type described employing a slotted guard member and a toothed cutter member, one or both of such members being of resilient construction so as to automatically compensate for wear incurred in the use of the device; the provision of a dry shaver having a slotted outer guard member which is designed to be formed from a sheet metal stamping; the provision of a dry shaver employing a toothed cutter which is adapted to be formed from a sheet metal stamping; the provision of a dry shaver employing a guard member which is folded over upon itself and in which the edge of the fold is notched or slotted to define a series of angularly bent cutter bars; the provision of a dry shaver employing a corrugated shear plate in which the edges of the individual corrugations are slotted widthwise of the plate to define a plurality of series of cutter bars; the provision of a device of the type described employing a guard member which is V-shaped in cross-section, the edge of the V-shaped portion being slotted crosswise to define a series of angularly disposed or bent cutter bars; the provision of a dry shaver having a handle and a circular guard member coaxial therewith and having slots defining a series of cutter bars coaxial with the axis of the guard and the handle; the provision of a dry shaver having a handle and an annular guard member in the form of a surface of revolution about the axis of the handle and a cutter operable inside the guard member and rotatable about the axis of such guard member; the provision of a dry shaver having a motor which may be started and brought up to speed before the shaver is placed into operation; and the provision of a dry shaver having a slotted guard member and one or more adjustable cutters which are automatically and centrifugally adjustable with respect to the guard member.

Stated in general terms, the invention comprehends the provision of a dry shaver of the type employing a slotted guard plate and a cooperating toothed cutter carried by a hollow handle which houses a manually operable inertia motor, the motor being arranged to be brought up to speed and then connected to the shaver by means of a manually operable clutch.

In one form of the invention, the guard member forms a plurality of slots arranged at different levels, with the individual slots of each row staggered with respect to the slots of the other rows so as to shave a large area for each stroke of the device. The device is provided with cutters having toothed portions which cooperate with the slots of the guard member. The slots of the device may be formed by bent-over comb teeth or they may be in the form of notches cut into a suitably formed guard member.

In another form of the invention, the guard member is formed from a single stamping and it cooperates with a cutter which is also formed from a sheet metal stamping. In the form of the device in which the guard member and cutter are made from sheet metal, the guard member may be pressed out to form one or more rows of cutting blades, the slots defined by such blades being arranged in staggered relation with respect to the slots of the other rows.

In yet another form of the invention, the guard member is circular in outline with a rim portion which is V-shaped in cross-section. The V-shaped part of the guard member is formed with a series of closely spaced slots arranged parallel to the handle of the device and a toothed cutter is rotatably mounted inside the guard member. The cutter of this device may be arranged to be centrifugally and automatically adjustable. This result may be accomplished by holding the cutters out of contact with the guard member until the device attains a predetermined speed, at which speed the centrifugal force of the cutter becomes sufficient to permit the cutters to move into contact with the guard member. The form of the invention employing a circular guard member may be used in connection with an oscillatable cutter instead of a rotatable cutter.

These and other objects of the invention will become more apparent and better understood after consideration has been given to the following detailed description of the invention taken in connection with the drawings which show, merely by way of illustration, structure adapted for carrying out the objects of the invention.

Figure 24:
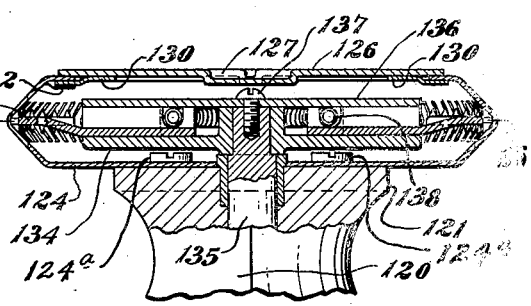
Figure 22:
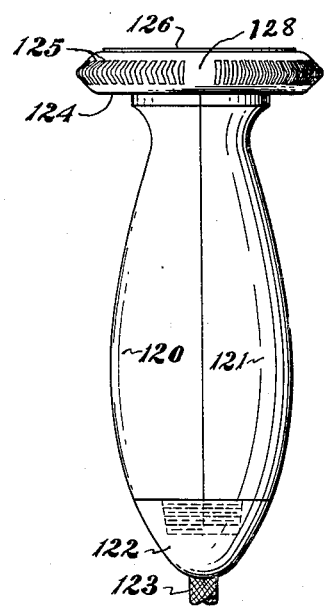
Figure 25:
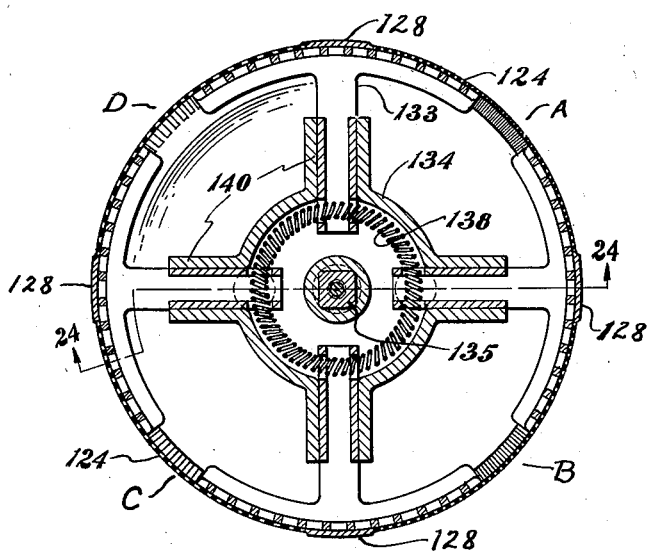
Figure 28:
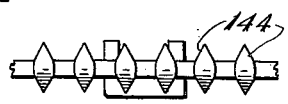
Figure 26:
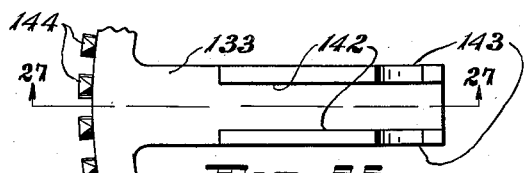
Figure 29:
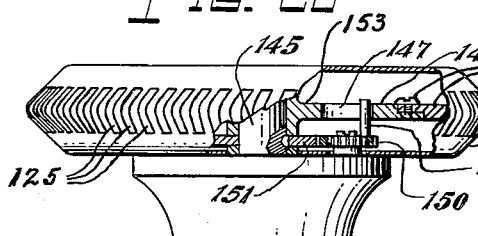
Figure 27:
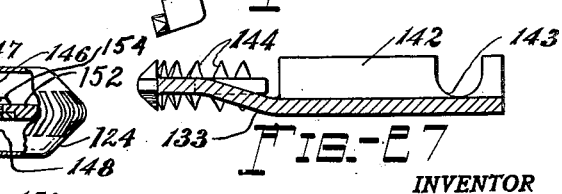

In the drawings:

Figure 1 is a side elevational view of a haircutting or shaving device illustrative of one form of the invention; Figure 2 is a similar view of the device shown in Figure 1 and in which the device has been rotated 90 degrees in a clockwise direction about its axis; Figure 3 is a detail sectional view taken on line 3—3, Figure 6; Figure 4 is a detail sectional view taken on line 4—4, Figure 6; Figure 5 is an enlarged detail plan view of a portion of the cutter head used in connection with the device illustrated in Figure 1; Figure 6 is an enlarged detail sectional view taken on line 6—6, Figure 1; Figure 7 is an enlarged perspective view showing the construction of the cutter head; Figure 8 is a perspective view of a modified form of guard member which may be used in place of the guard members shown in Figures 1 and 7; Figure 9 is an enlarged fragmentary view illustrating the details of a guard member with a modified form of comb teeth; Figure 10 is another form of hair-cutting or shaving device illustrative of the invention; Figures 11 and 12 are enlarged detail sectional views taken on lines 11—11 and 12—12, respectively, of Figure 10; Figure 13 is a detail sectional view taken on line 13—13, Figure 12; Figure 14 illustrates another modification of the invention; Figure 15 is a perspective view of the guard member used in connection with the device illustrated in Figure 14; Figure 16 is an enlarged sectional view of the guard member taken on line 16—16, Figure 15; Figure 17 is a perspective view of a movable cutter member which is used in connection with the guard member illustrated in Figure 15; Figure 18 is a side elevational view of the cutter shown in Figure 17; Figure 19 is a plan view, partly in section, of the cutter head of the device shown in Figure 14; Figure 20 is a perspective view of yet another modification of the invention; Figure 21 is a fragmentary perspective view of the movable cutter used in the shaver shown in Figure 10; Figure 22 is a side elevational view of a further modification of the invention in which a rotatable cutter is employed; Figure 23 is a plan view of the cutter head of the shaver shown in Figure 22; Figure 24 is an enlarged sectional view taken on line 24—24, Figure 25; Figure 25 is an enlarged sectional view taken on line 25—25, Figure 24; Figure 26 is an enlarged detail view of one of the cutters; Figure 27 is a sectional view taken on line 27—27, Figure 26; Figure 28 is an end view of a portion of the toothed cutter shown in Figure 27; and Figure 29 is a side elevational view, partly in section, illustrating a shaver of the same general type as illustrated in Figure 22 and in which an oscillatable cutter is employed instead of a rotatable cutter, as in the form of the invention shown in Figure 22.

The hand-operated hair-cutting or shaving device illustrated in Figure 1 comprises a hollow handle formed from mating halves 1 and 2, which is adapted for removably supporting a cutter head. The cutter head includes a guard member, indicated generally by the numeral 3, and a co-operating movable cutter, indicated generally by the numeral 4, which together form the cutter head of the device. The cutter head may be removably held in place in the handle by means of one or more screws 5.

At the back of the handle, a pair of screws 6 are provided for urging springs 7 into engagement with pins 8 which contact the rear edge portion of the cutter 4 and thus serve to urge the toothed part of the cutter into contact with the slotted part of the guard member 3. The cutter 4 is reciprocated by means of an eccentric pin 10 carried on the shaft 11 of a hand-operated motor. The halves of the handle may be secured together in any suitable manner, as for example, by means of screws 12.

A hand lever 13 is pivotally carried at one side of the handle of the device and by means of this handle, power may be supplied by the user for effecting the operation of a hand-driven motor which is located inside the handle. The lever 13 is connected to a rack bar 14 by means of a pivot pin 15. At its upper end the lever 13 is pivotally attached to the handle by means of a pin 17. A spring 18 and a plunger 20 urge the lever 13 toward its outermost position.

The rack bar 14 is provided with gear teeth 21 which mesh with the teeth of a pinion 22 rotatably mounted upon a shaft 23. The pinion 22 is fixed with respect to a driving clutch member 24 having cam faces which engage with balls or rollers 25 and thus serve to force such rollers into driving engagement with the inner rim 26 of a gear 27 which is located above the pinion 22 and which also acts as a driven clutch member of the one-way clutch.

The gear 27 meshes with a gear 28, fixed to a shaft 30 which is rotatably mounted inside the handle of the shaver. A fourth gear 31 is secured to the shaft 30 above the gear 28. The gear 31 meshes with a gear 32 which is keyed to the shaft 23. At its upper end the shaft 23 is pinned at 33a to a fly-wheel 33. The fly-wheel 33 is bored for rotatably receiving the lower enlarged portion 34 of the shaft 11. The upper face of the fly-wheel 33 is formed with a dished conical surface 35, providing a driving clutch face which co-operates with a conically-faced member 36, slidably and non-rotatably mounted on the shaft 34.

The driven clutch part 36 is urged against the driving clutch face 35 by means of a spring 42. The driven clutch part 36 is formed with an annular groove for receiving a clutch-shifting collar 37 operatively associated with one end of a bell crank 38 which is pivoted at 40 to the handle of the shaver. The arm 41 of the clutch-shifting bell crank is provided with a push-button 16 projecting outwardly beyond the surface of the handle of the shaver in position to be readily manipulated by the thumb of the user.

In the operation of this form of the device, the lever 13 may be quickly operated several times and at the same time this is being done, the operator's thumb may contact the push-button 16 and hold the clutch parts 35 and 36 out of engagement with each other. When the motor of the device is operating at high speed, the thumb may be removed from the clutch control button 16 and the shaver will thus be placed in operation by reason of the movement of the eccentric pin 10 in the slot 43 of the cutter of the device and several up and down strokes of the shaver may be made on the face of the user before it is necessary to re-energize the motor. This mode of operation is desirable and advantageous where the shaver is operated in places where it is not convenient to mainpulate the motor driving lever. Ordinarily, however, the hand lever may be reciprocated continuously as the shaver is moved over the face of the user.

The cutter 4 of the device is provided with flanges or ribs 45 which slidably contact with the sides of the guard member 3 and guide the cutter in its movement. The cutter is enlarged at 46 to provide a series of steps 47, 48 and 50, upon which cutter blades 51, 52 and 53 are mounted. The cutter blades may be formed from relatively thin resilient spring steel and the forward edges of these cutters are notched to form suitable cutting teeth such as indicated by the numerals 51a, 52a and 53a in Figure 5.

The toothed portions of the cutters are bent-up slightly from the plane of the main portions of the cutter blades to permit yielding contact between the toothed portions 51a, 52a and 53a of the cutters 51, 52 and 53 and the guard members 57, 58 and 60. Suitable screws or rivets 54, 55 and 56 may be used to secure the cutter blades to the stepped portions of the cutter. The guard members 57, 58 and 60 are carried by bars 61, 62 and 63 respectively and the ends of these bars are fastened to or made integral with the end walls of the guard member 3.

As shown in Figure 7, the side walls of the guard member 3 terminate at some distance below the cutters so as to facilitate the removal of hairs which are cut during the operation of the device.

By referring to Figure 5, it will be seen that the individual notches of each row are staggered with respect to the notches of the other rows, so that when the shaver is moved once across a given area, it will substantially cut all of the hairs in such area, and because of this, it is possible in the use of this device to obtain a clean shave in a very short period of time.

Figure 9 shows a slightly modified form of comb teeth for the guard member in which the comb teeth are provided with narrow ends 68 and tapering sides 69 connecting with straight-sided portion 69a, which define relatively narrow slots beneath which the teeth 68a of a cutter reciprocate. The wider portions of the slots serve to stretch the skin and press the hairs in an upright position when they move into the narrow portions of the slots where they are sheared off by the cutter teeth 68a.

Figure 8 illustrates a modified form of guard member which may be formed from a single piece of sheet metal having a stepped portion along one edge, and at the edges of such stepped portions, four series of notches 64, 65, 66 and 67 are cut. This form of guard member is adapted to be used in connection with a cutter of the type previously described and illustrated in Figures 1 to 7 of the drawings.

In the form of the invention illustrated in Figure 10, the device is provided with a hollow handle formed from mating halves 70 and 71 for the housing of a motor (not shown). The motor is provided with a manually operable starting wheel 72 which is carried by the armature shaft 74 of the motor. The shaft 74 is provided with an eccentric pin 75 at its outer end.

The pin 75 is received in a slotted bearing member 74a attached to a relatively thin cutter plate 77, the ends of which are bent-over at 76 and slotted at 76a to form a series of cutter bars which cooperate with a folded-over sheet metal guard member 78, the edges of which are slotted at 80 to form a series of cutter bars which cooperate with the slotted portions of the cutter. The contiguous edges of the guard member may be welded to each other as indicated by the numeral 73.

A rectangular opening 77a is formed at each side of the top of the guard member to facilitate the removal of hairs which are sheared off during the operation of the device and similar openings (not shown) may be provided at the underside of the guard member if desired. The guard member 78 is provided with lengthwise extending offset portions 81 which provide space for reception of fibrous oil-retaining material 82 by means of which the cutter may be lubricated. The guard member is provided at its underside with suitable openings 84 and 85 which cooperate with rivets 86 and 87 to effect the attachment of the cutter head to the handle. This operation is facilitated by arranging the shaft 74 so that it may be axially shifted out of engagement with the cutter and the guard member.

It will be seen upon consideration of Figures 11 to 13, that after the wheel 72 and the shaft 74 are moved downwardly as far as they can go, the cutter head may be slid to the left to bring the heads of the rivets 86 and 87 into registry with the enlarged openings 84 and 85 of the cutter head whereby the same may be lifted from the handle for cleaning or other purposes.

In the modification illustrated in Figure 14, the cutter head is provided with a generally rectangular sheet metal guard member in the form of a corrugated plate 93, the individual corrugations 106 of which are provided with slots 103 extending widthwise of the plate. A similarly formed corrugated plate 94 having slots 104, constitutes a cutter which is adapted to be reciprocated in contact with the rear face of the plate 93 so that hairs projecting through the slots of the guard member will be sheared off by the cutter during its reciprocation. Springs 94a hold the cutter 93 in contact with the guard member 94.

The ends of the corrugated plate 93 are provided with laterally extending securement members which are notched at 95a and 102 for registry with securement bars 95 and 101 respectively. The bar 101 is fixedly mounted in the handle 99 of the shaver. The bar 95 is attached to one end of a lever 96 which is pivoted at 96a to the handle 99. A spring 96b is provided to urge the lever in a direction so that the bar 95 will be maintained in engagement with the notch 95a of the guard member. Removal of the guard member may be readily effected upon pressing the exposed end of the lever 96 whereupon the bar 95 will be withdrawn from engagement with the notch 95a of the guard member and the guard member then may be readily removed from the handle 99.

A notched or slotted plate 105 is attached to the rear side of the cutter 94. The notch of this plate receives the pin 108 of an orcillatable lever 109 which is pivotally mounted in the handle on a pin 110. At the end of the lever 109, remote from the pin 108, a notch or slot 111 is provided for receiving an eccentric pin 112 which is fixed to the operating shaft 113 of the device. This shaft may constitute the armature shaft of a motor (not shown) which may be carried inside the handle 99. The numeral 114 indicates the starting wheel of the motor of this form of shaver.

The form of shaver illustrated in Figure 20 is very similar to the device illustrated in Figure 10 and it differs therefrom principally in that the slotted edge 115 of the guard member is V-shaped in cross-section instead of being of rounded construction as shown in Figure 10. A cutter 116, which is also much the same as the cutter 77, is shaped at its one edge so as to conform to the V-shaped configuration of the guard member 115.

The guard member is provided at its other side with three V-shaped corrugations 117 which are slotted in the same manner as for the edge 115 and the cutter 116 is similarly shaped at this side of the device with notched or slotted ridges 118 similar to those illustrated in Figure 17. The slots which are formed in the portions 117 of the guard member are arranged in staggered relation in the manner previously described for the form of the guard member illustrated in Figure 15.

The form of the invention illustrated in Figure 22 comprises a hollow handle formed from mating halves 120 and 121 and an internally threaded end cap 122 by means of which one end of the handle sections are secured together. The end cap is apertured for receiving an electric cord 123 by means of which current is supplied to a motor (not shown) which is housed within the handle. The other end of the handle is held together by screws 124a which are received in suitable openings in a guard member 124, which is attached in this manner to the end of the handle.

In this modification of the invention, the cutter head is in the form of a surface of revolution about the axis of the handle of the shaver and it comprises a hollow disk-like guard member 124 having a peripheral portion which is V-shaped in cross-section and which is provided with slots 125 defining a series of angularly disposed cutter bars. A cover plate 126 is detachably secured to the top of the guard member. The cover plate is notched at 127 for receiving a screw driver or other tool by means of which the cover may be readily removed from the guard member.

The circular guard member 124 may be provided with four equi-distantly spaced, relatively narrow, unslotted sections 128 in which the material at the edge of the guard member is considerably thicker than it is for the rest of the guard member so as to strengthen the guard member at these points. The sections 128 form the ends of the slotted quadrants A, B, C and D of the guard member of the shaver. The thickness of the material at the peripheral portion of the guard member may be ground down so that it is thinnest at the outermost peripheral portion.

The thickness of the peripheral portion of the guard member may be different for each of the four different quadrants A, B, C and D of the guard member and the slots 125 may be narrower and may be spaced closer to each other in the different quadrants. It is preferred to have the narrowest and most closely spaced slots in the quadrant where the metal is the thinnest and to increase the width and spacing of the slots as the thickness of the metal in the other quadrants is increased.

Thus for example, in quadrant A the guard member may be two thousandths of an inch thick at its thinnest portion and the slots may be six thousandths of an inch wide. In quadrant B the guard member may be made four thousandths of an inch thick and the slots may be made eight thousandths of an inch wide. In quadrant C the guard member may be made eight thousandths of an inch thick and the slots may be made ten thousandths of an inch wide, and in quadrant D the guard member may be made twenty thousandths of an inch thick and the slots may be made twelve thousandths of an inch wide.

By reason of this arrangement, it is possible to provide a hair cutting device with four selectively usable sections, in which the hairs of different persons may be cut with substantially the same degree of closeness or in which the hair of any one person may be sheared off at different distances from the surface of the skin. In the use of this shaver, a cutting section may be selected which is most comfortable to the user of the device. The skin and hair varies greatly in different individuals and it is possible in an arrangement such as is disclosed herein to provide a single shaver which may be successfully used on substantially every type of skin and beard.

It is, of course, understood that the slots may be omitted from one or more of the sections A, B, C and D as but one of these sections is required for the making of an operable shaver, and where the cost of the device is an important item, it could be constructed with but one of the slotted sections A, B, C or D and the remaining portion of the guard member could be left unslotted.

The cover plate 126 is provided at its underside with a pair of spring clips 130. The guard member is notched at 131 for receiving the free ends of the spring clips 130. The guard member may be pressed down at 132 to provide a pair of stops for the spring clips 130 and in this manner a quickly detachable securement device is provided for the cover plate 126.

The guard member 124 may be formed from a single piece of sheet metal of uniform thickness which may be spun to the shape shown. After the guard member has been formed it may be hardened and the peripheral edge portions ground down to the desired taper and thickness after which the slots 125 may be cut in the guard member. It is, of course, understood that the order of some of these operations may be changed if desired and that the shape of the guard member and cutter may be varied from the precise shape shown.

Interiorly of the guard member, there is located a plurality of rotatably driven segmental cutters 133. Four of these cutters are used in the form of the invention shown in the drawings. It is to be understood, of course, that a lesser or a greater number of cutters may be used if desired. The cutters 133 are slidably carried in the grooved arms 140 of a spider 134 which is fixed to the square end of a shaft 135 which may constitute an extension of the armature shaft of the motor which is carried in the handle of the device.

A circular plate 136 is fastened on top of the spider 134 by means of a screw 137, and in this manner, the cutters are secured in position on the operating shaft 135. The individual cutters are provided with bent-up sides 142 which are freely slidable in the hollow spokes or arms 140 of the spider 134. The sides 142 are notched at 143 for receiving a coiled spring 138 which serves to counterbalance to some extent the centrifugal force of the cutters when they are rotated.

The outermost portions of the cutters are provided with a series of cutter teeth 144 which traverse the intermediate portion of the slots of the guard member. The teeth of the cutter are arranged so that they do not extend completely across the length of the slots of the guard member so as to facilitate the entry of the hairs into the slots of the guard member prior to the time they are exposed to the teeth of the cutter, and in this manner, the shaving operation is greatly facilitated.

The shaver shown in Figures 22 to 28 may be operated with a very small motor because the motor is not subjected to any substantial load until the device has come up to speed, at which time the cutters move radially outwardly under influence of centrifugal force and contact with the inner surface of the guard member. The spring 138 also serves to keep the frictional force of contact between the cutter and guard member down to a minimum.

It is, of course, understood that the cutter bars of the rotatable cutter may be fixedly secured with respect to the driving member and it is also to be understood that the number of teeth of the rotatable cutter may be varied over rather wide limits when the cutter is rotatably driven. The illustrated arrangement of teeth for the cutter permits the cutter to be operated with an oscillatory motion as illustrated in the modification shown in Figure 29, in which each of the cutter members 152 may be fixedly attached to the arms 146 of a spider 153 by means of a screw 154.

The spider 153 has a slotted portion 147 for receiving an eccentric pin 148. This pin is carried by a gear 150 which is driven by a gear 151 keyed to the motor shaft 145. This form of shaver operates in substantially the same manner as for the shavers of the type employing a reciprocable cutter, such as shown in the earlier views of the drawings.

The various forms of shaving devices disclosed herein are adapted to be motor-driven or hand-driven and it will be understood that the shaver shown in Figures 1 to 9 may be operated with an electric motor or any other suitable power-driving means and that the shaver shown in Figures 10 to 29 of the drawings may be manually operated by means of an arrangement such as that shown in Figures 1 to 9 of the drawings.

The single edged, slotted guard member used in connection with the rotatable shavers shown in Figures 22 to 29 may be modified by forming the peripheral portion of the guard member with a series of annular, slotted corrugations after the manner proposed for the form of shavers shown in Figures 14 and 20 and the cooperating cutters would be shaped to conform to such guard members.

The foregoing description and the accompanying drawings to which it relates, describes what might be termed the preferred mode of practicing the invention. It is to be clearly understood, however, that the invention includes each and every novel feature or combination of novel features herein disclosed, subject only to the restrictions of the prior art, and that the invention may assume other forms and it is not to be limited to the particular and specific structure shown and described herein.

Having thus described my invention what I claim is:

1. In a shaving device of the type described, a guard member of stepped construction having a plurality of rows of slots located one above the other in different planes with the slots of each row arranged one alongside of the other, and a plurality of cutters with cutter teeth traversing said slots, the individual slots of each row being staggered with respect to the slots of the next adjacent row.

2. A shaving device of the type described comprising a guard member of stepped construction with a plurality of rows of cutter bars adapted for simultaneous contact with the skin, said cutter bars projecting freely from the body of said guard member and defining comb teeth, and a plurality of cutters with cutter teeth cooperating with said cutter bars, such rows of bars being each located on a different elevation and in a different plane.

3. A shaving device of the type described comprising a plurality of slotted guard members defining steps located in different planes and on different elevations and adapted for simultaneous contact with the skin, and a toothed cutter cooperating with each of said guard members, the slots of said guard member having a diverging portion and also a straight-sided portion beneath which the teeth of the cutter operate.

4. In a shaving device of the type described, a guard member of stepped construction with notches cut in the edges of such steps and a cutter having toothed portions movable across the end portion of the notches of the guard member.

5. A shaving device as set forth in claim 4, in which the individual notches of each series of notches are staggered with respect to the notches of the adjacent series of notches.

6. A shaving device comprising a guard member of stepped construction with notches cut in the edges of such steps, the uppermost of said steps having a row of notches at each of its opposite longitudinal edges, cutter means having cutter teeth adapted to sweep across a portion at least of said notches at the underside of said guard member, and means for translating said cutter means.

7. A shaving device of the type described comprising a guard member with a plurality of rows of cutter bars adapted for simultaneous contact with the skin and a plurality of cutters with cutter teeth cooperating with said cutter bars, such rows of cutter bars each being located in a different plane and at a different elevation and defining a series of steps, the uppermost of said steps having cutter bars at its opposite longitudinal edges.

EDMUND J. TE PAS.